US006942377B1

(12) United States Patent
Goldstein

(10) Patent No.: US 6,942,377 B1
(45) Date of Patent: Sep. 13, 2005

(54) THERMOREACTIVE BEVERAGE STIRRER

(76) Inventor: Robert B Goldstein, 3924 S. Ferdinand St., Seattle, WA (US) 98118

( * ) Notice: Subject to any disclaimer, the term of this patent is extended or adjusted under 35 U.S.C. 154(b) by 176 days.

(21) Appl. No.: 10/369,310

(22) Filed: Feb. 19, 2003

(51) Int. Cl.[7] ............................................... A47J 43/27
(52) U.S. Cl. ...................... 366/129; 366/142; 374/141; 374/162
(58) Field of Search ................................ 366/129, 142, 366/342, 343; 374/141, 157, 159, 161, 162

(56) References Cited

U.S. PATENT DOCUMENTS

| 138,800 | A | * | 5/1873 | Grover |
| 782,433 | A | * | 2/1905 | Ashley |
| 797,371 | A | * | 8/1905 | Raubold |
| 856,768 | A | | 6/1907 | Comins |
| 1,623,666 | A | * | 4/1927 | Ferkel |
| 2,579,738 | A | * | 12/1951 | Wilfrid |
| 2,591,375 | A | * | 4/1952 | Radford |
| 3,298,671 | A | * | 1/1967 | Jewett et al. |
| 3,382,512 | A | * | 5/1968 | Atchley |
| 3,665,770 | A | | 5/1972 | Sagi et al. |
| 3,695,110 | A | | 10/1972 | Biolik |
| 4,457,252 | A | * | 7/1984 | Manske |
| 4,738,549 | A | * | 4/1988 | Plimpton |
| 4,854,712 | A | | 8/1989 | Mori |
| 5,549,382 | A | | 8/1996 | Correia, II et al. |
| 5,575,563 | A | | 11/1996 | Chiu et al. |
| 5,685,641 | A | | 11/1997 | Ribi |
| 5,713,664 | A | | 2/1998 | Harilela |
| 5,918,981 | A | * | 7/1999 | Ribi |
| 6,220,746 | B1 | * | 4/2001 | Stern |
| 6,420,184 | B1 | | 7/2002 | Hof |
| 2003/0147450 | A1 | * | 8/2003 | Wiltonsky et al. |

FOREIGN PATENT DOCUMENTS

| DE | 3636173 A1 | * | 5/1988 |
| GB | 2274334 | * | 7/1994 |

* cited by examiner

Primary Examiner—Charles E. Cooley
(74) Attorney, Agent, or Firm—Michael I Kroll

(57) ABSTRACT

The present invention 10 discloses a disposable beverage stirrer for coffee, tea, soups and the like 12 comprising a flat elongate wooden or composite stick 14 having thermoplastic material imbedded therein for detecting the temperature of a beverage 12 so that the user 16 can be made aware whether or not the beverage or substance in question is suitable to consume without causing the burning or scalding of an individual's mouth. The thermoreactive material is not readily visible when at room temperature because it is inactive. However, it reacts to and is activated by the temperature of the beverage 12 when inserted therein. Two messages 22, 24 are imbedded thereon, one to notify that the beverage 12 is safe to drink and another informing the user 16 that a high risk of scalding exists. Multiple embodiments of the present invention 10 are disclosed.

14 Claims, 10 Drawing Sheets

THERMOREACTIVE BEVERAGE STIRRER

BACKGROUND OF THE INVENTION

1. Field of the Invention

The present invention relates generally to temperature indication devices and, more specifically, to a hot beverage stirrer with thermoreactive material embedded therein to inform the user whether or not the beverage is safe to drink or if a danger of scalding or burning is present.

2. Description of the Prior Art

There are other devices designed for indicating the temperature of a substance. Typical of these is U.S. Pat. No. 856,768 issued to Comins on Jun. 11, 1907.

Another patent was issued to Sagi et al. on May 30, 1972 as U.S. Pat. No. 3,665,770. Yet another U.S. Pat. No. 3,695,110 was issued to Biolik on Oct. 3, 1972 and still yet another was issued on Aug. 8, 1989 to Mori as U.S. Pat. No. 4,854,712.

Another patent was issued to Correia, II, et al. on Aug. 27, 1996 as U.S. Pat. No. 5,549,382. Yet another U.S. Pat. No. 5,575,563 was issued to Chiu et al. on Nov. 19, 1996. Another was issued to Ribi on Nov. 11, 1997 as U.S. Pat. No. 5,685,641 and still yet another was issued on Feb. 3, 1998 to Harilela as U.S. Pat. No. 5,713,664.

Another patent was issued to Stern on Apr. 24, 2001 as U.S. Pat. No. 6,220,746. Yet another U.S. Pat. No. 6,420,184 was issued to Hof on Jul. 16, 2002.

The combination with a spoon having a bowl and an open tubular stem extending therefrom, of a thermometer bulb located in the bowl and having a tube extending into said stem, and a guard covering the bowl and having a tube extending into said stem, and a guard covering said bulb, as and for the purpose described.

A thermometer is provided comprising a heat conductive carrier on which there are one or more temperature sensitive regions comprising temperature responsive substances having preselected and relatively precise points at which a temperature induced change in state will begin to occur. In multiple region systems, the regions are spaced apart and the substances a successively graduated with respect to the points. Included is a coloration or other indicator means and a material so positioned with respect to the temperature responsive substance and the indicator means as to be capable of incorporating or otherwise demonstrably responding to the indicator means as a result of the initiation of a temperature responsive change in the temperature responsive substance.

A temperature measuring device in the shape of a spoon or in another shape suited for feeding purposes comprising a feeding instrument having a handle and a food holding portion adapted for holding food to be eaten, the handle having a recess therein and a temperature measuring means disposed in the recess and adapted to be read to provide an indication of the temperature of the food held in the food holding portion.

A multi-color luminous stirrer including a handle housing therein a battery and a shank composed of two tubular-shaped electrodes coupled together mechanically through an insulating ring. When the tubular-shaped electrodes are submerged in a drink, a switching circuit is actuated and in accordance with the movement of an electroconductive ball placed freely on a flat electrode that is connected to the battery and encircled by curved electrodes which are electrically connected to a plurality of illuminants housed at the tip of the shank by transparent or translucent cap, ON and OFF states are created between the electrodes. Thus, the illuminants emit light at random. The tubular-shaped shank may alternately be formed of a highly heat conductive material, with a bimetal housed therein so that when the tubular-shaped shank is dipped in a drink which is different in temperature from that of the ambient air, the switching circuit is actuated.

An apparatus and method for automatically stirring foodstuffs in a kitchen environment are provided. The apparatus and method use a stove top having a plurality of cooking locations, the stove top having a top surface to support a plurality of cooking vessels and a means for heating in operable association with each of the cooking locations, and a driver means for driving an agitator device wherein the driver means is positioned in axial alignment with at least one of the cooking locations.

A multiusage thermometer comprises a body portion capable of selectively detachably engaging thereto at least a first sensing portion, a second sensing portion, a third sensing portion and a fourth sensing portion each of said sensing portions having a first engaging member at a first end thereof, said body portion integrally forming a second engaging member at one end thereof for electrically and complementarily connecting thereto said first engaging member of each of said sensing portions. This invention offers a thermometer being multiusable and having a body portion capable of being selectively detachably engaged with other sensing portions of various usages based on the situation one faces.

Temperature probes are provided comprising a porous or permeable substrate into which is absorbed at least at the surface a diyne monomer. The absorption is achieved by employing a solution of the diyne monomer in a solvent which is transported by the solid substrate. After impregnation of the substrate, the diyne is polymerized to provide a blue product, which upon being heated above a transition temperature turns to red. Various substrates and devices may be employed for a variety of situations requiring a determination of the occurrence of a particular minimum temperature.

A beverage stirrer having a pop out item such as figurine, logo or product replica is provided. The stirrer includes a hollow, tubular casing with a sliding mechanism formed therein. The sliding mechanism can comprise a buoyant member actuated by fluid pressure from a beverage being stirred. Alternately, the sliding mechanism can comprise a temperature sensitive spring actuated by a temperature differential created by the beverage. The pop out item can be mounted to an end of the sliding mechanism and can be configured to extend out of an open end of the casing as the beverage is stirred. The stirrer can also include a handle/display member wherein indicia such as advertising or a logo can be printed.

For the purpose of a simple and yet functionally dependable design of the temperature detection, an agitator apparatus, in particular a cooking spoon, with a handle (1), a spoon element (2) and a shaft (3) connecting the handle (1) with the spoon element (2), wherein a temperature sensor (54) is associated with the spoon element (2) and a temperature indicator (5) with the handle (1), is distinguished in that a heat-conducting and/or liquid-conducting connection (6) exists via a viscous mass (9) is disposed between the temperature sensor (4) and the temperature indicator (5).

A measured quantity liquid dispenser including a liquid supply container and an attached liquid dispensing chamber. The dispensing chamber has a hinged lid with a locking ledge. A slide plate is moveable between a first position where flow of liquid between the supply container and the dispensing chamber is prevented and the lid of the dispensing chamber is unlocked, and a second position where flow is permitted between the supply container and the dispensing chamber and the lid of the dispensing chamber is locked. The liquid dispenser is inverted with the slide plate moved to the second position to refill the dispensing chamber. The dispenser is especially useful to limit a child's use of a liquid composition such as mouthwash or shampoo.

While these temperature indicator devices may be suitable for the purposes for which they were designed, they would not be as suitable for the purposes of the present invention, as hereinafter described.

SUMMARY OF THE PRESENT INVENTION

The present invention discloses a disposable beverage stirrer for coffee, tea, soups and the like comprising a flat elongate wooden or composite stick having thermoplastic material imbedded therein for detecting the temperature of a beverage so that the user can be made aware whether or not the beverage or substance in question is suitable to consume without causing the burning or scalding of an individual's mouth. The thermoreactive material is not readily visible when at room temperature but reacts to the temperature of the beverage when inserted therein. Two messages are imbedded thereon, one to notify that the beverage is safe to drink and another informing the user that a high risk of scalding exists. Multiple embodiments of the present invention are disclosed.

A primary object of the present invention is to provide a thermoreactive beverage stirrer for hot beverages that responds to the temperature of the fluid into which it is placed to inform the user that the fluid is safe to drink without the risk of burning or scalding.

Another object of the present invention is to provide a thermoreactive beverage stirrer for hot beverages having thermoreactive materials that respond to two different temperature ranges, one that becomes visible when the fluid is below 135 degrees Fahrenheit and another that becomes visible when the fluid is above 135 degrees Fahrenheit.

Yet another object of the present invention is to provide a thermoreactive beverage stirrer for hot beverages wherein the different temperature ranges only appear once exposed to the fluid and provide a color-coded and/or text-oriented visual indicator informing the user of the temperature of said fluid.

Still yet another object of the present invention is to provide a thermoreactive beverage stirrer for hot beverages that may be disposable or reusable but with a preferred embodiment that is disposable.

Another object of the present invention is to provide a thermoreactive beverage stirrer for hot beverages that will enable the user to avoid burns and scalding from beverages that are too hot for human consumption.

Yet another object of the present invention is to provide a thermoreactive beverage stirrer for hot beverages that will help reduce the liability of establishments serving hot beverages.

Still yet another object of the present invention is to provide a thermoreactive beverage stirrer for hot beverages that is simple and easy to use.

Still another objective of the present invention is to provide a thermoreactive beverage stirrer for hot beverages that is inexpensive to manufacture and operate.

Additional objects of the present invention will appear as the description proceeds.

The present invention overcomes the shortcomings of the prior art by providing a thermoreactive beverage stirrer for hot beverages that allows a user to stir the beverage as with a conventional stirrer but includes thermoreactive materials embedded on the surface thereof to provide color-coded text messages informing the user if the beverage is safe to drink or if it is too hot for immediate consumption.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
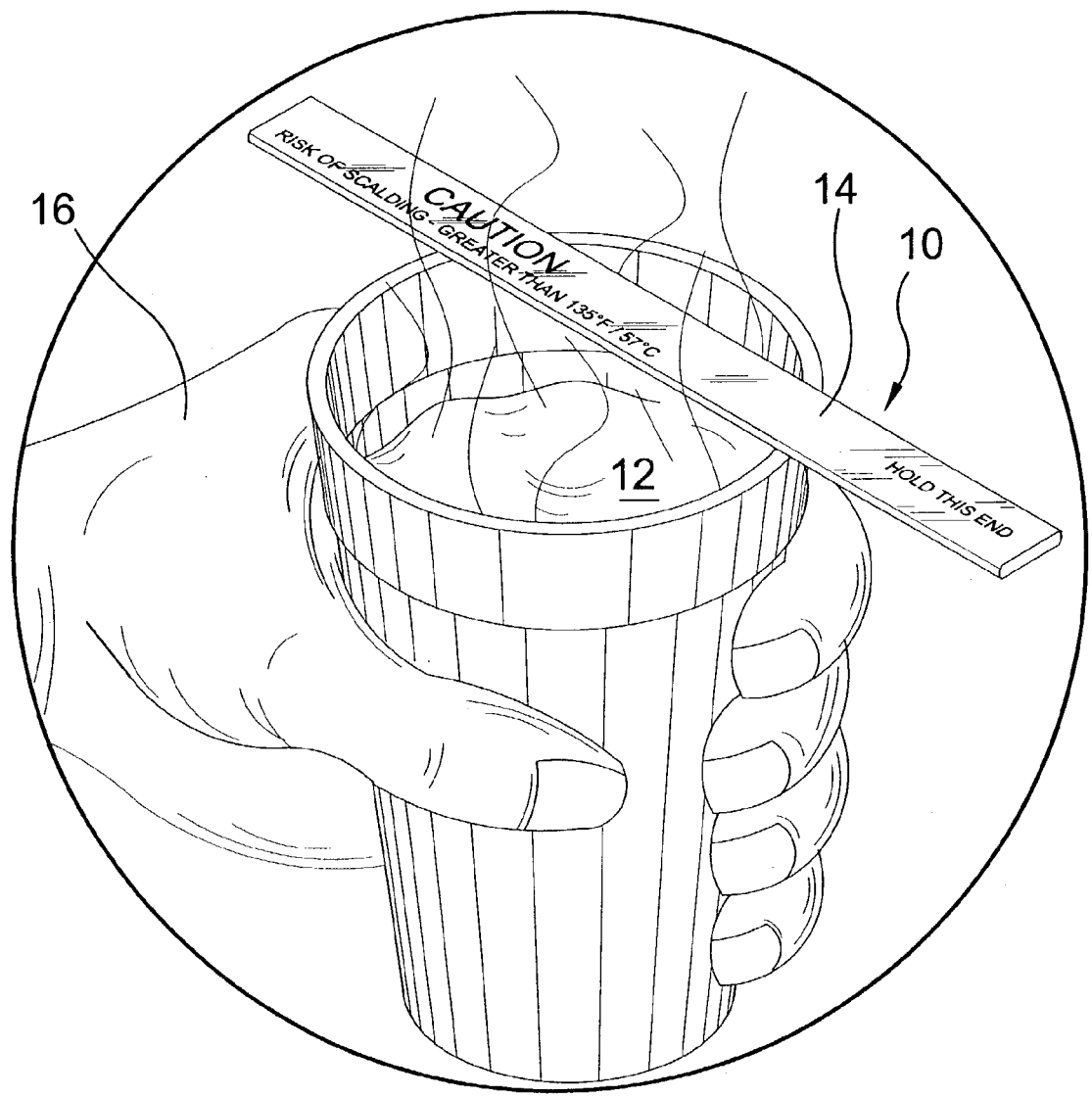
FIG. 1 is an illustrative view of the present invention in use.

With regard to reference numerals used, the following numbering is used throughout the drawings.

10 present invention
12 beverage
14 stick
16 user
18 container
20 arrow
22 caution message
24 safe message
26 inactive thermoreactive material
28 window
29 color indicator
30 housing
32 recess
34 transparent film
36 bottom

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is the present invention 10 after having been used to stir a hot beverage 12. The present invention 10 is a disposable beverage stirrer for coffee, tea, soups and the like 12 comprising a flat elongate wooden or composite stick 14 having thermoplastic material imbedded therein for detecting the temperature of a beverage 12 so that the user 16 can be made aware whether or not the beverage or substance in question is suitable to consume without causing the burning or scalding of an individual's mouth. The thermoreactive material is not readily visible when at room temperature because it is inactive. However, it reacts to and is activated by the temperature of the beverage 12 when inserted therein. Two messages are imbedded thereon, one to notify that the beverage 12 is safe to drink and another informing the user 16 that a high risk of scalding exists.

Figure 2:
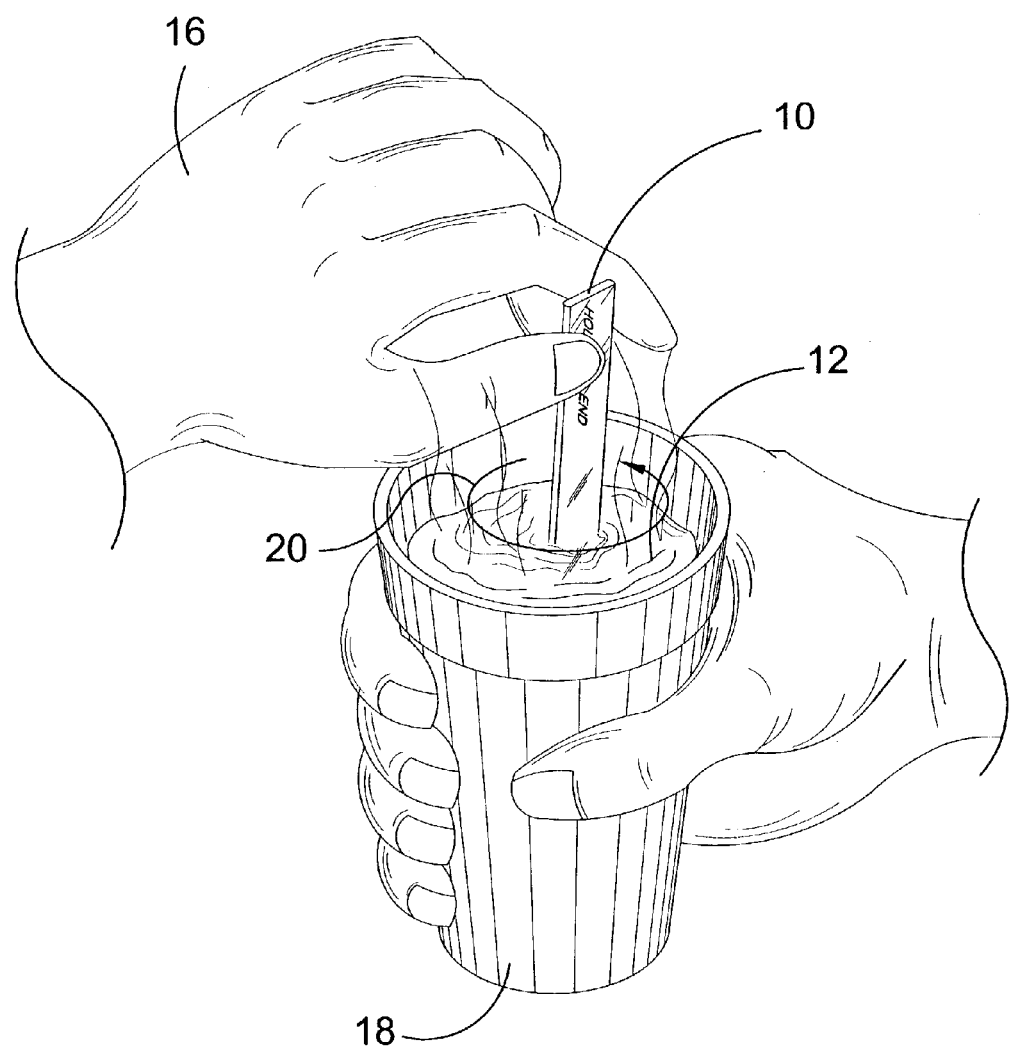
FIG. 2 is an illustrative view of the present invention in use.

Turning to FIG. 2, shown therein is an illustrative view of the present invention 10 in use. Shown is the present invention 10 being used as a stirrer shown by arrow 20 for the agitation and mixing of a beverage 12. The thermoreactive compound integrated into the structure of the present invention 10 experiences exposure to the heated beverage 12 allowing for an indication of the thermal properties of the beverage to be displayed on the surface thereof and read by the user 16 when removed. A beverage container 18 is also shown.

Figure 3:
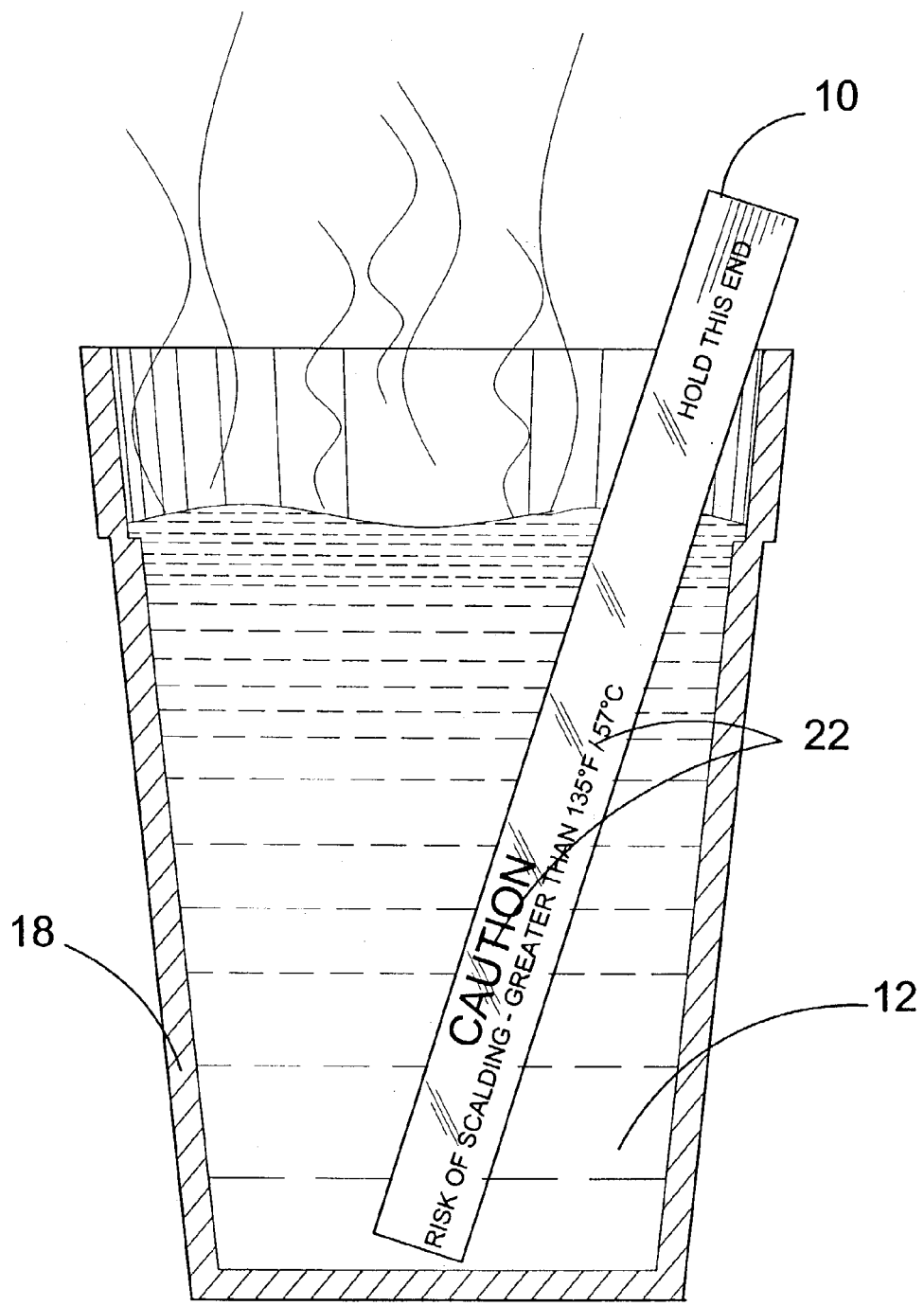
FIG. 3 is a sectional view of the present invention in a hot fluid with risk of scalding.

Turning to FIG. 3, shown therein is a sectional view of the present invention 10 in a hot fluid 12 with risk of scalding. Shown is the present invention 10 placed within a hot beverage 12 with the present invention indicating a high level of danger 22 that tells the user that if the beverage were to be consumed burning or scalding of the user's mouth would result. This is indicated by the appearance of red indicia stating: "caution risk of scalding—greater than 135° F./57° C." at 22 on the surface of the stirrer 10. As the liquid/beverage cools to below 135° F./57° C. this red indicia which is color coded fades away as the alternative message appears on the other side of the stirrer. Beverage container 18 is also shown. Note that for all embodiments disclosed in this specification, the red caution message would be shown at temperatures greater than or equal to 135 degrees F.; and, the green safe message would be shown at temperatures less than 135 degrees F.

Figure 4:
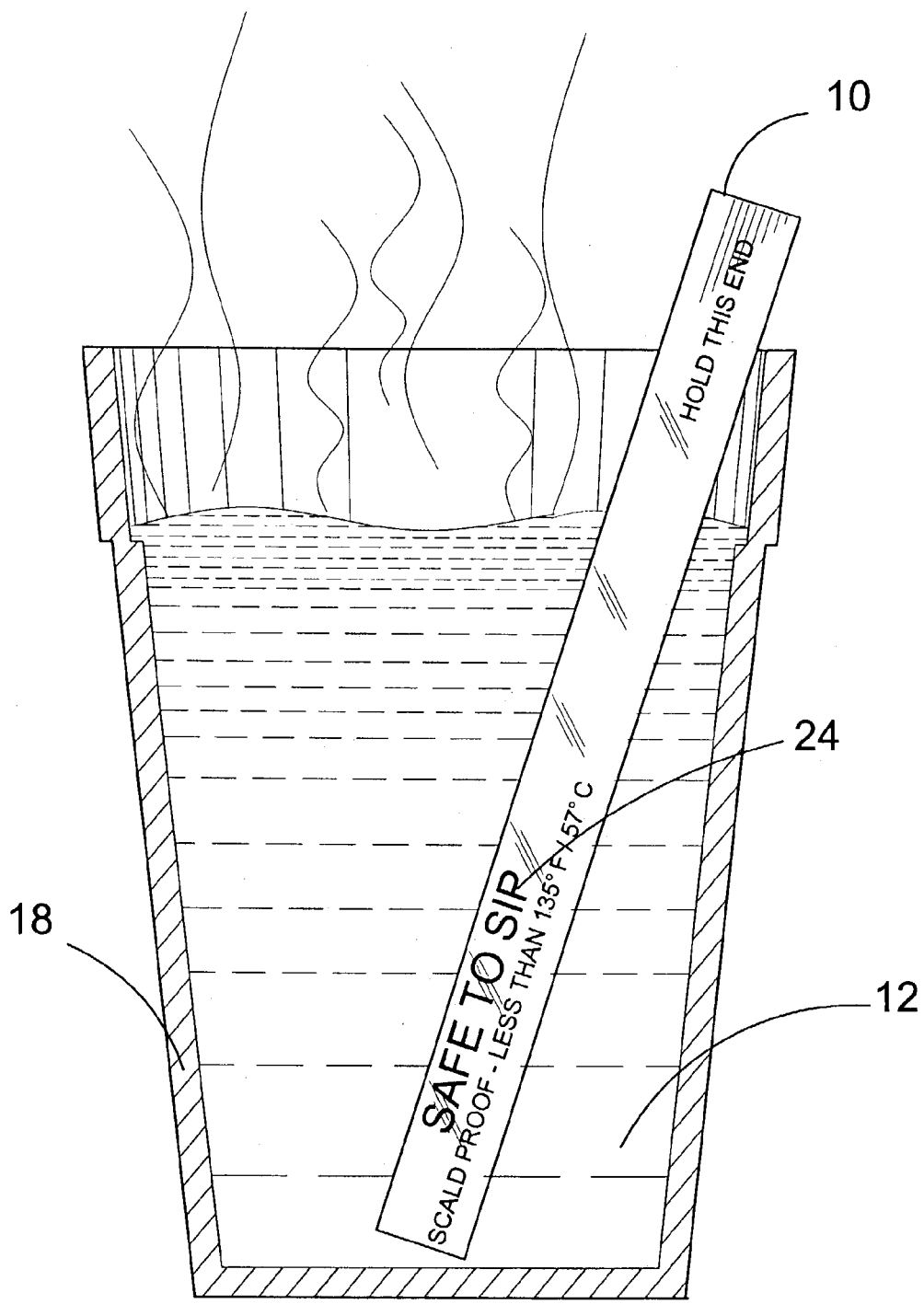
FIG. 4 is a sectional view of the present invention in a warm fluid.

Turning to FIG. 4, shown therein is a sectional view of the present invention 10 in a warm fluid. Shown is the present invention 10 placed within a warm beverage 12 with the present invention indicating a safe temperature level 24 that informs the user that if the beverage were to be consumed burning or scalding of the user's mouth would not result. This is indicated by the appearance of green indicia stating: "scald proof—less than 135° F./ 57° C." at 24 on the surface of the stirrer 10, which appears as the liquid/beverage cools to less than 135° F./57° C. This green indicia which is color coded would also fade away if the temperature of the beverage would rise to greater than 135° F./57° C. as the red cautionary message reappears. Beverage container 18 is also shown.

Figure 5:
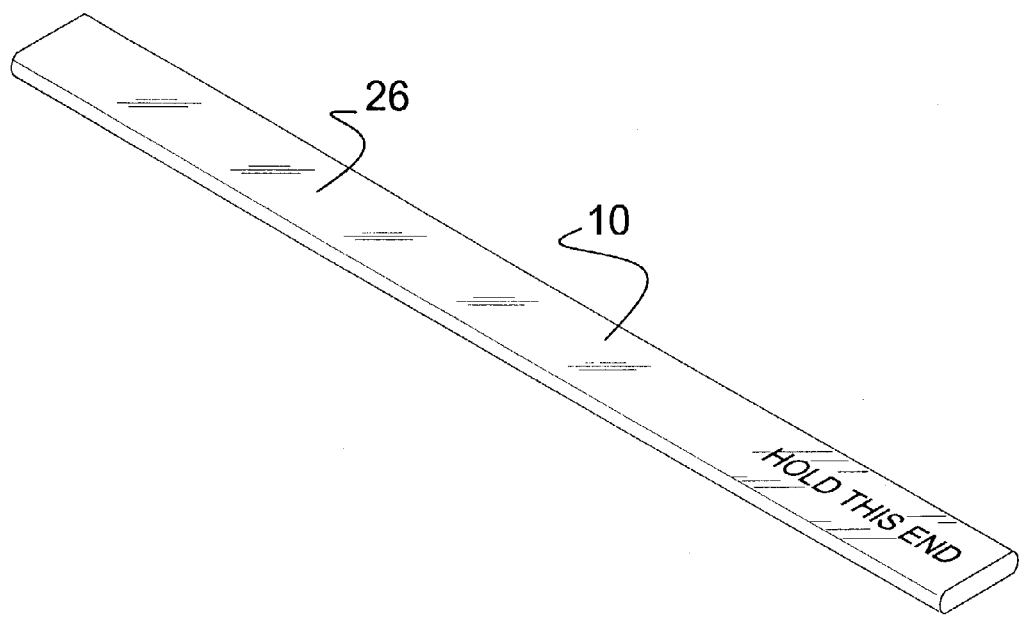
FIG. 5 is a perspective view of the present invention.

Turning to FIG. 5, shown therein is a perspective view of the present invention 10. Shown is the present invention 10 prior to insertion into a heated beverage. The indicia defined by the thermoreactive material 26 being inactive at room temperature is not visible. The thermoreactive material 26 responds accordingly once inserted into the beverage and will inform the user whether or not the beverage is safe to drink once removed therefrom.

Figure 6:
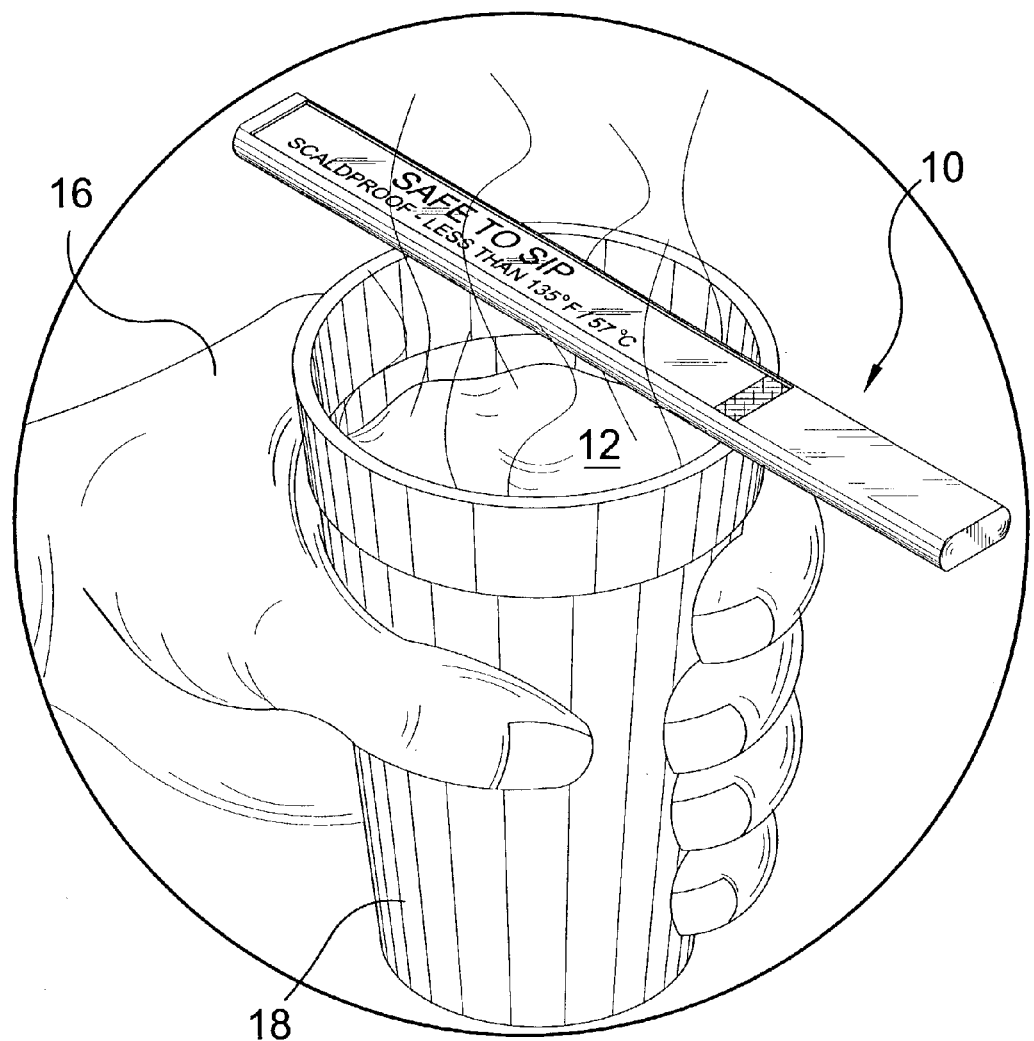
FIG. 6 is an illustrative view of an alternate embodiment of the present invention.

Turning to FIG. 6, shown therein is an illustrative view of an alternate embodiment of the present invention 10. Shown is the present invention 10 constructed in the form of a beverage stirrer having thereon and embedded into its outside surface apertures that work in cooperation with strips of thermoreactive material that make the present invention suitable and useful in the application of providing the user 16 a means of detecting the temperature of a beverage 12 so that the user can be made aware whether or not the beverage or substance in question is suitable to consume without causing the burning or scalding of an individual's mouth. The present invention may be disposable or reusable. Beverage container 18 is also shown.

Figure 7:
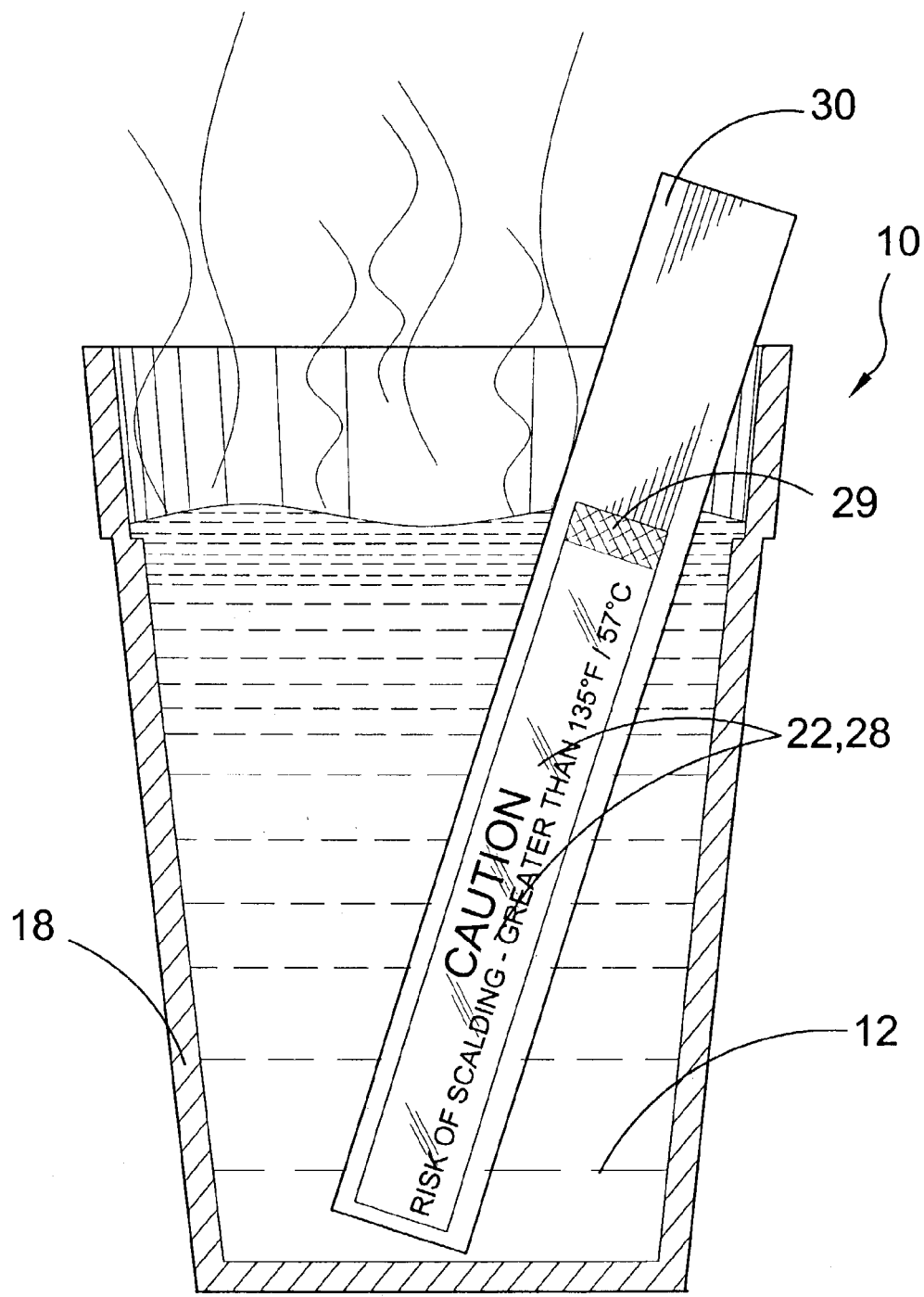
FIG. 7 is a sectional view of an alternate embodiment of the present invention in a hot fluid with risk of scalding.

Turning to FIG. 7, shown therein is a sectional view of an alternate embodiment of the present invention 10 in a hot liquid 12 with risk of scalding. Shown is the present invention 10 placed within a hot beverage 12 with the present invention indicating a heat level of danger 22 that tells the user that if the beverage were to be consumed burning or scalding of the user's mouth would result. This is indicated by the color indicator window 29 turning red, as well as a statement of "caution risk of scalding—greater than 135° F./57° C." at 22 appearing in the thermoreactive window 28 which is contained within the housing 30 of the present invention. Beverage container 18 is also shown.

Figure 8:
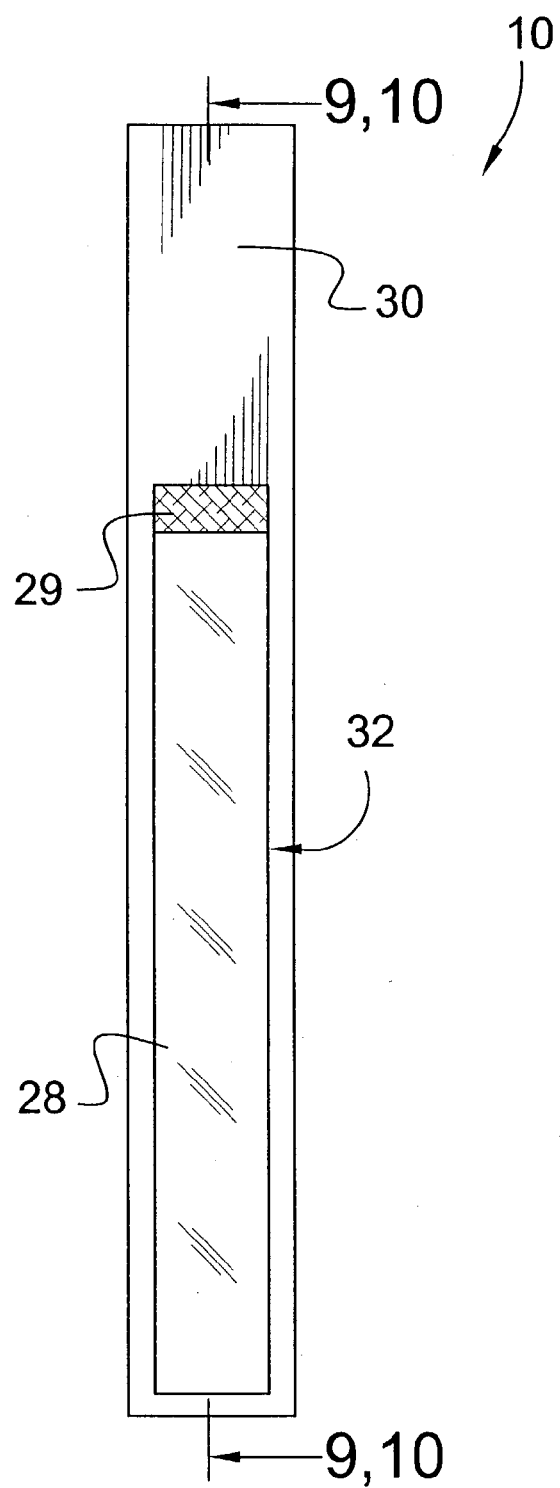
FIG. 8 is a front view of an alternate embodiment of the present invention.

Turning to FIG. 8, shown therein is a front view of an alternate embodiment of the present invention 10. Shown is the present invention 10 having apertures 32 forming a window 28 for reading the written indicia of caution or safe temperature and viewing the color-coded indicator 29. The written indicia and color indication appears when the thermoreactive material is submerged into warm or hot liquid contents and reacts according to the current temperature of the contents. Housing 30 is also shown.

Figure 9:
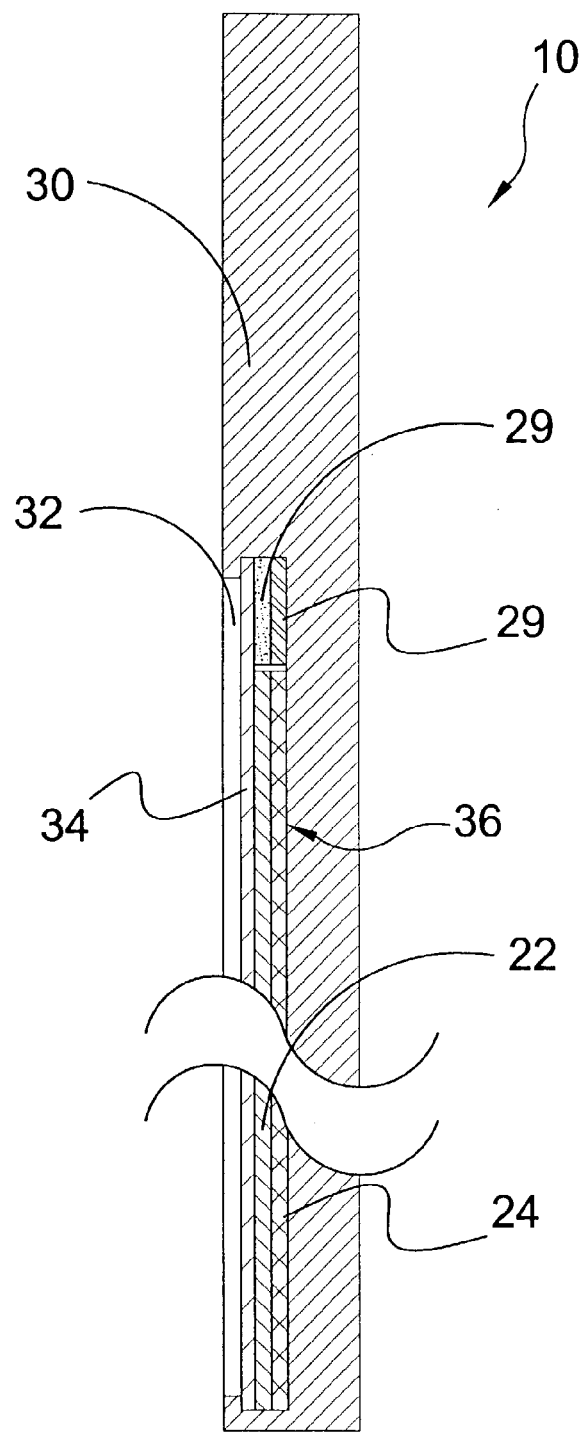
FIG. 9 is a cross section of an alternate embodiment of the present invention.

Turning to FIG. 9, shown therein is a cross section view of an alternate embodiment of the present invention 10. Shown is a cross section from FIG. 6. The transparent window is composed of a transparent thermoconductive film 34 and creates a barrier between the liquid contents and the thermoreactive films. When submerged into liquid contents the thermoreactive films reacts according to the current temperature of the contents providing the user means to detect safe consumption. Shown are the caution message 22 and red indicator 29 and the safe message 24 with green indicator 29. Also shown are the housing 30 and recess 32. Recess 32 extends about one half way through the housing 30 and has a bottom 36 therein.

Figure 10:
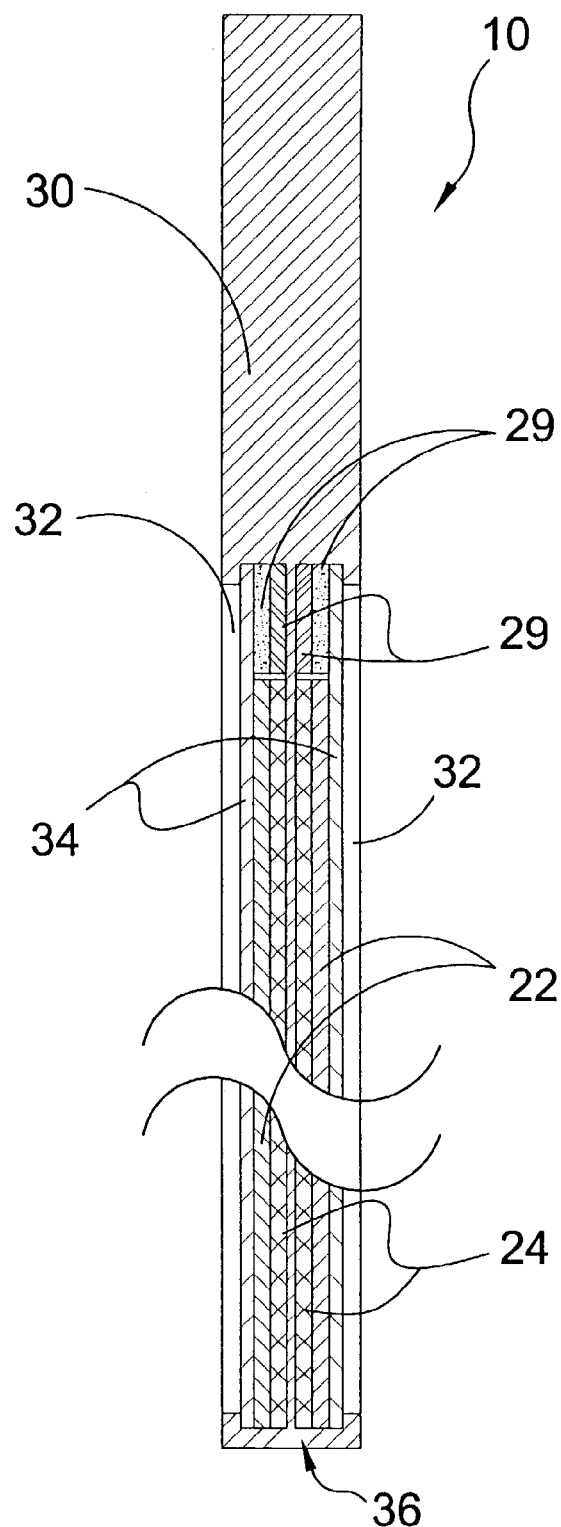
FIG. 10 is a cross section of an alternate embodiment of the present invention with an additional element.

Turning to FIG. 10, shown therein is a cross section of an alternate embodiment of the present invention 10 with an additional element. Shown is the present invention 10 having the components for indicating a beverages temperature on both sides thereof to enable the user to view the results from either side. Shown are the two caution messages 22 and two red indicators 29, and the two safe messages 24 with two green indicators 29. Also shown are the housing 30, two recesses 32 and two transparent thermoconduction films. The pair of recesses 32 have a mutual or common bottom 36 about one-half the distance between the opposing sides of the housing 30.

I claim:

1. A thermoreactive beverage stirrer, comprising:
   a) an elongated housing having first and second opposing ends, said housing having first and second opposing sides, said body being substantially flat to serve as a beverage stirrer, said housing having a recess therein;
   b) wherein said recess is disposed on said first side of said housing between said first and second opposing ends, said recess extending about one-half the distance between said first and second opposing sides, said recess having a bottom;
   c) a first layer of thermoreactive film disposed in said bottom of said recess, wherein said first layer of thermoreactive film is responsive to the temperature of the beverage, wherein said first layer of thermoreactive film indicates a first message, said first layer having a top side;
   d) a second layer of thermoreactive film disposed on top of said first layer of thermoreactive film in said recess, wherein said second layer of thermoreactive film is responsive to the temperature of the beverage, wherein said second layer of thermoreactive film indicates a second message, said second layer having a top side; and,
   e) a transparent thermoconductive film disposed on top of said second layer of thermoreactive film to permit a user to view said first and second layers of thermoreactive film.

2. The stirrer of claim 1, wherein said first thermoreactive film indicates a first message when said beverage has a temperature greater than or equal to 135 degrees Fahrenheit.

3. The stirrer of claim 2, wherein said second thermoreactive film indicates a second message when said beverage has a temperature less than 135 degrees Fahrenheit.

4. The stirrer of claim 3, wherein said first message is colored red.

5. The stirrer of claim 4, wherein said first message is colored green.

6. The stirrer of claim 3, further comprising a red thermoreactive indicator window disposed on one end of said first layer of thermoreactive film.

7. The stirrer of claim 6, further comprising a green thermoreactive indicator window disposed on one end of said second layer of thermoreactive film.

8. A thermoreactive beverage stirrer, comprising:
   a) an elongated housing having first and second opposing ends, said housing having first and second opposing sides, said body being substantially flat to serve as a beverage stirrer, said housing having a recess on each of said first and second opposing sides;
   b) wherein one each of said recesses is disposed on each of said first and second sides of said housing between said first and second opposing ends, each said recess extending about one-half the distance between said first and second opposing sides, wherein each said recess has a common bottom;
   c) a first layer of thermoreactive film disposed in said bottom of each said recess, wherein said first layer of thermoreactive film is responsive to the temperature of the beverage, wherein said first layer of thermoreactive film indicates a first message, said first layer having a top side;
   d) a second layer of thermoreactive film disposed on top of said first layer of thermoreactive film in each said recess, wherein said second layer of thermoreactive film is responsive to the temperature of the beverage, wherein said second layer of thermoreactive film indicates a second message, said second layer having a top side; and,
   e) a transparent thermoconductive film disposed on top of each said second layer of thermoreactive film to permit a user to view each said first and second layers of thermoreactive film.

9. The stirrer of claim 8, wherein said first thermoreactive film indicates a first message when said beverage has a temperature greater than or equal to 135 degrees Fahrenheit.

10. The stirrer of claim 9, wherein said second thermoreactive film indicates a second message when said beverage has a temperature less than 135 degrees Fahrenheit.

11. The stirrer of claim 10, wherein said first message is colored red.

12. The stirrer of claim 11, wherein said second message is colored green.

13. The stirrer of claim 10, further comprising a red thermoreactive indicator window disposed on one end of each said first layers of thermoreactive film.

14. The stirrer of claim 13, further comprising a green thermoreactive indicator window disposed on one end of each said second layers of thermoreactive film.

\* \* \* \* \*